United States Patent
Nagai et al.

(10) Patent No.: US 12,039,387 B2
(45) Date of Patent: Jul. 16, 2024

(54) IC CARD AND IC CARD SYSTEM

(71) Applicant: Murata Manufacturing Co., Ltd., Kyoto-fu (JP)

(72) Inventors: Takahiro Nagai, Nagaokakyo (JP); Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 18/059,774

(22) Filed: Nov. 29, 2022

(65) Prior Publication Data

US 2023/0091589 A1    Mar. 23, 2023

Related U.S. Application Data

(63) Continuation of application No. PCT/JP2021/004027, filed on Feb. 4, 2021.

(30) Foreign Application Priority Data

Jun. 2, 2020 (JP) .................................. 2020-096001

(51) Int. Cl.
    *G06K 19/07*      (2006.01)
    *H02J 7/00*      (2006.01)
    (Continued)

(52) U.S. Cl.
    CPC ...... *G06K 19/0701* (2013.01); *H02J 7/00712* (2020.01); *H02J 50/12* (2016.02);
    (Continued)

(58) Field of Classification Search
    CPC ........ H02J 50/80; H02J 50/12; H02J 7/00712; G06K 19/0701; G06K 7/0008; H04B 5/79; H04B 5/0037; H04B 5/0056
    See application file for complete search history.

(56) References Cited

U.S. PATENT DOCUMENTS 9,535,563 B2 *   1/2017   Hoffberg ................ H04N 5/782
11,398,123 B1 *   7/2022   Mars ........................ G07C 9/21
(Continued)

FOREIGN PATENT DOCUMENTS

JP      2012-238126 A     12/2012
JP      2012238126 A *   12/2012  ............. B42D 15/10
(Continued)

OTHER PUBLICATIONS

International Search Report issued in PCT/JP2021/004027; mailed Apr. 6, 2021.

*Primary Examiner* — Daniel I Walsh
(74) *Attorney, Agent, or Firm* — Studebaker & Brackett PC

(57) ABSTRACT

An IC card communicates with a reader/writer, which is induction-type read/write communication equipment, in a contactless manner. A power supply control circuit detects presence or absence of power reception in accordance with an output voltage of a power receiving circuit, detects presence or absence of predetermined communication by using an electronic functional circuit, starts to charge an electrical energy storage device by using a charging circuit when there is not the predetermined communication immediately after power reception is detected, and supplies power from a voltage conversion circuit to the electronic functional circuit without starting to charge the electrical energy storage device by using the charging circuit when there is the predetermined communication immediately after power reception is detected.

20 Claims, 6 Drawing Sheets

(51) Int. Cl.
  *H02J 50/12* (2016.01)
  *H02J 50/80* (2016.01)
  *H04B 5/77* (2024.01)
  *H04B 5/79* (2024.01)
(52) U.S. Cl.
  CPC ............... *H02J 50/80* (2016.02); *H04B 5/77* (2024.01); *H04B 5/79* (2024.01)

(56) References Cited

U.S. PATENT DOCUMENTS

| | | | | |
|---|---|---|---|---|
| 11,416,726 | B2* | 8/2022 | Eaton | G06K 19/0712 |
| 2006/0287763 | A1* | 12/2006 | Ochi | H02J 7/00036 |
| | | | | 700/231 |
| 2008/0122297 | A1* | 5/2008 | Arai | H02J 50/20 |
| | | | | 307/154 |
| 2011/0147468 | A1* | 6/2011 | Park | G06K 19/0723 |
| | | | | 235/492 |
| 2012/0104993 | A1* | 5/2012 | Huang | H02J 50/90 |
| | | | | 320/106 |
| 2015/0249360 | A1* | 9/2015 | Ichikawa | H02J 50/90 |
| | | | | 320/108 |
| 2017/0300799 | A1* | 10/2017 | Breed | G06K 19/0718 |
| 2018/0101718 | A1* | 4/2018 | Lowe | G06F 18/251 |
| 2018/0157300 | A1* | 6/2018 | Kamepalli | G06F 13/24 |
| 2019/0236320 | A1* | 8/2019 | Ahluwalia | G06K 19/0718 |
| 2019/0244210 | A1* | 8/2019 | Cheng | G06K 19/07705 |
| 2020/0005108 | A1* | 1/2020 | Frandsen | G06K 19/0716 |
| 2021/0019586 | A1* | 1/2021 | Dreifus | G06F 21/34 |
| 2021/0042759 | A1* | 2/2021 | Larsen | G06Q 20/4012 |
| 2021/0073608 | A1* | 3/2021 | Finn | B21D 5/16 |
| 2021/0150175 | A1* | 5/2021 | Lundberg | G06V 40/1306 |
| 2021/0224626 | A1* | 7/2021 | Lundahl | G06K 19/077 |
| 2021/0256338 | A1* | 8/2021 | Kollig | G06K 19/07769 |
| 2021/0357716 | A1* | 11/2021 | Eaton | G06K 19/0709 |
| 2021/0365401 | A1* | 11/2021 | Eaton | G06F 13/4282 |
| 2022/0231543 | A1* | 7/2022 | Tornambe | H02J 50/12 |
| 2022/0321172 | A1* | 10/2022 | Hosotani | H04B 5/0037 |
| 2022/0383004 | A1* | 12/2022 | Nagai | H02J 50/10 |
| 2022/0407564 | A1* | 12/2022 | Hosotani | H02J 50/12 |
| 2023/0028305 | A1* | 1/2023 | Li | H02J 50/10 |
| 2023/0035613 | A1* | 2/2023 | Yang | H02J 50/12 |
| 2023/0045879 | A1* | 2/2023 | Tunnell | G06Q 30/0269 |
| 2023/0053247 | A1* | 2/2023 | Chan | G06F 18/24 |
| 2023/0091589 | A1* | 3/2023 | Nagai | H02J 7/00712 |
| | | | | 235/492 |
| 2023/0095548 | A1* | 3/2023 | Hosotani | G06K 19/07354 |
| | | | | 235/492 |
| 2023/0268776 | A1* | 8/2023 | Nagai | H04B 5/0037 |
| | | | | 320/108 |
| 2023/0289793 | A1* | 9/2023 | Ortiz | G06Q 20/40 |
| | | | | 705/40 |

FOREIGN PATENT DOCUMENTS

| | | | |
|---|---|---|---|
| JP | 2013-211971 | A | 10/2013 |
| JP | 2013211971 | A * | 10/2013 |
| JP | 2019-115148 | A | 7/2019 |

\* cited by examiner

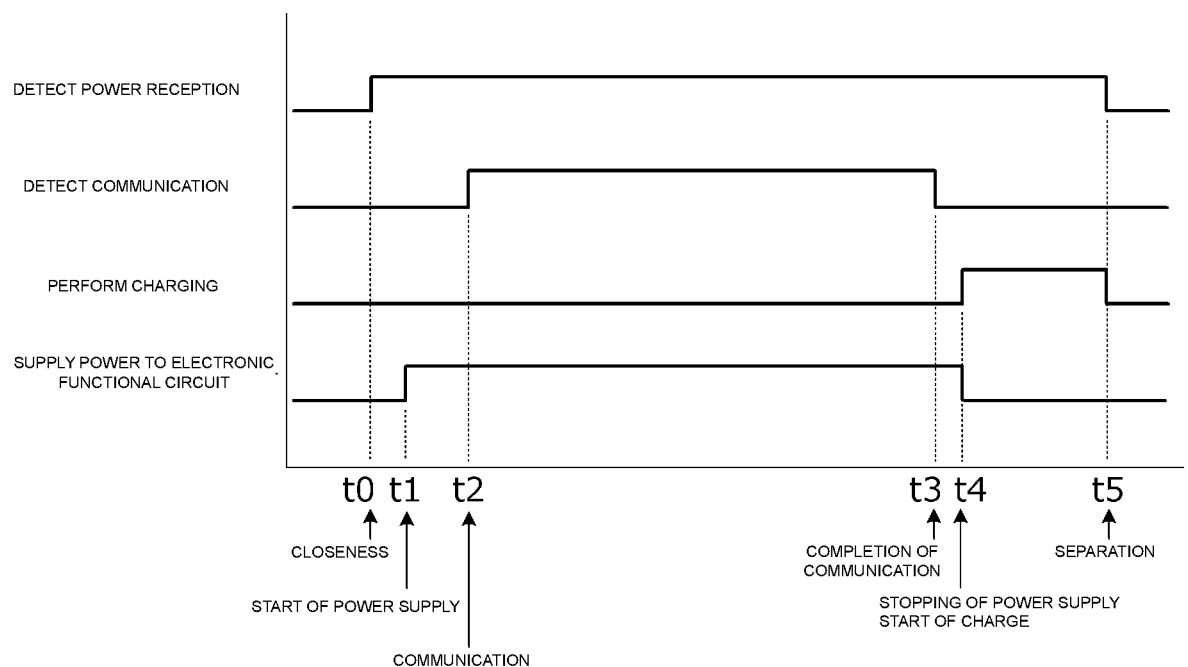

IC CARD AND IC CARD SYSTEM

CROSS-REFERENCE TO RELATED APPLICATIONS

This application claims benefit of priority to International Patent Application No. PCT/JP2021/004027, filed Feb. 4, 2021, and to Japanese Patent Application No. 2020-096001, filed Jun. 2, 2020, the entire contents of each are incorporated herein by reference.

BACKGROUND

Technical Field

The present disclosure relates to an IC card including an electrical energy storage device and an IC card system using the IC card.

Background Art

As an example of an IC card including a secondary battery, Japanese Unexamined Patent Application Publication No. 2012-238126 discloses an IC card equipped with fingerprint authentication. This IC card includes a fingerprint reader sensor and is configured to store power supplied from a reader by using an electrical energy storage circuit and discharge, when an output voltage of the electrical energy storage circuit reaches a preset value, power to a device control circuit and a fingerprint processing circuit. The IC card is configured to, when fingerprint authentication succeeds, enable transmission and reception to and from the reader and then disable transmission and reception to and from the reader to turn off the discharge to the device control circuit and the fingerprint processing circuit.

Such an IC card in which wireless charging is performed includes a secondary battery, and a charging status of the secondary battery changes significantly depending on a usage status of the IC card. However, it is desirable that the IC card can be charged by using various devices, such as a dedicated power transmission device, an induction-type read/write device, and a communication terminal with an induction-type read/write function.

SUMMARY

A secondary battery has to be charged if energy stored in the secondary battery becomes insufficient, whereas, when the secondary battery is charged, received power is used for charging, making it impossible to cause an electronic functional circuit, such as a communication circuit or electronic data processing circuit of an electronic card, to operate.

Furthermore, for a plurality of devices, such as a dedicated power transmission device, an induction-type read/write device, and a communication terminal with an induction-type read/write function, when a power receiving function or a communication function is used, a communication operation or a power receiving operation has to be managed and controlled appropriately.

However, most of the above-described various devices use alternating magnetic fields in the same frequency band, and it is difficult to perform management and control while distinguishing these alternating magnetic fields.

Thus, the present disclosure aims to provide an IC card and an IC card system in which, for example, for a dedicated power transmission device, an induction-type read/write device, and a communication terminal with an induction-type read/write function, operations performed by a communication circuit, a power receiving circuit, and an electronic functional circuit are managed and performed and in which thus easy-to-use wireless charging is performed.

An IC card, as an example of the present disclosure, being an IC card configured to communicate with a reader/writer, which is induction-type read/write communication equipment, in a contactless manner includes a power receiving coil, a power receiving circuit connected to the power receiving coil, a communication antenna, a communication circuit connected to the communication antenna, an electrical energy storage device, a charging circuit connected between the power receiving circuit and the electrical energy storage device, an electronic functional circuit connected to the communication circuit, a voltage conversion circuit connected between the electrical energy storage device and the electronic functional circuit, and a power supply control circuit configured to control the charging circuit and the voltage conversion circuit.

The power supply control circuit detects presence or absence of power reception in accordance with an output voltage of the power receiving circuit, detects presence or absence of predetermined communication by using the electronic functional circuit, and when there is not the predetermined communication immediately after power reception is detected, starts to charge the electrical energy storage device by using the charging circuit. Also, when there is the predetermined communication immediately after power reception is detected, the power supply control circuit supplies power from the voltage conversion circuit to the electronic functional circuit without starting to charge the electrical energy storage device by using the charging circuit.

When the above-described power supply control circuit performs control, immediately after power starts to be received, charging is started immediately when there is no communication, thus increasing charging efficiency of the electrical energy storage device and enabling a reduction in charging time period. Furthermore, immediately after power starts to be received, the electrical energy storage device is not charged when there is communication, thus enabling a sufficient supply of power to the electronic functional circuit.

An IC card, as an example of the present disclosure, being an IC card configured to communicate with a reader/writer, which is induction-type read/write communication equipment, in a contactless manner includes a power receiving coil, a power receiving circuit connected to the power receiving coil, a communication antenna, a communication circuit connected to the communication antenna, an electrical energy storage device, a charging circuit connected between the power receiving circuit and the electrical energy storage device, an electronic functional circuit connected to the communication circuit, a voltage conversion circuit connected between the electrical energy storage device and the electronic functional circuit, and a power supply control circuit configured to control the charging circuit and the voltage conversion circuit.

The power supply control circuit detects presence or absence of power reception in accordance with an output voltage of the power receiving circuit, detects presence or absence of predetermined communication by using the electronic functional circuit, supplies power from the voltage conversion circuit to the electronic functional circuit in accordance with power reception, and when there is the predetermined communication, continues supplying power from the voltage conversion circuit to the electronic functional circuit. Also, when there is not the predetermined communication, the power supply control circuit continues or stops supplying power from the voltage conversion circuit to the electronic functional circuit and starts to charge the electrical energy storage device by using the charging circuit.

When the above-described power supply control circuit performs control, immediately after power starts to be received, power is supplied immediately to the electronic functional circuit, thus increasing the responsivity of the electronic functional circuit and enabling completion of an operation performed by the electronic functional circuit in a short time period. Furthermore, immediately after power starts to be received, the electrical energy storage device starts to be charged when there is no communication, thus increasing charging efficiency of the electrical energy storage device and enabling a reduction in charging time period.

The present disclosure can provide an IC card and an IC card system in which charging and communication suitable, for example, for each of a dedicated power transmission device, an induction-type read/write device, and a communication terminal with an induction-type read/write function are automatically and efficiently performed.

BRIEF DESCRIPTION OF THE DRAWINGS

FIG. 11 is a time chart illustrating operations performed by the IC card according to the second embodiment after the IC card is moved closer to the reader/writer.

DETAILED DESCRIPTION

First Embodiment

Figure 1:
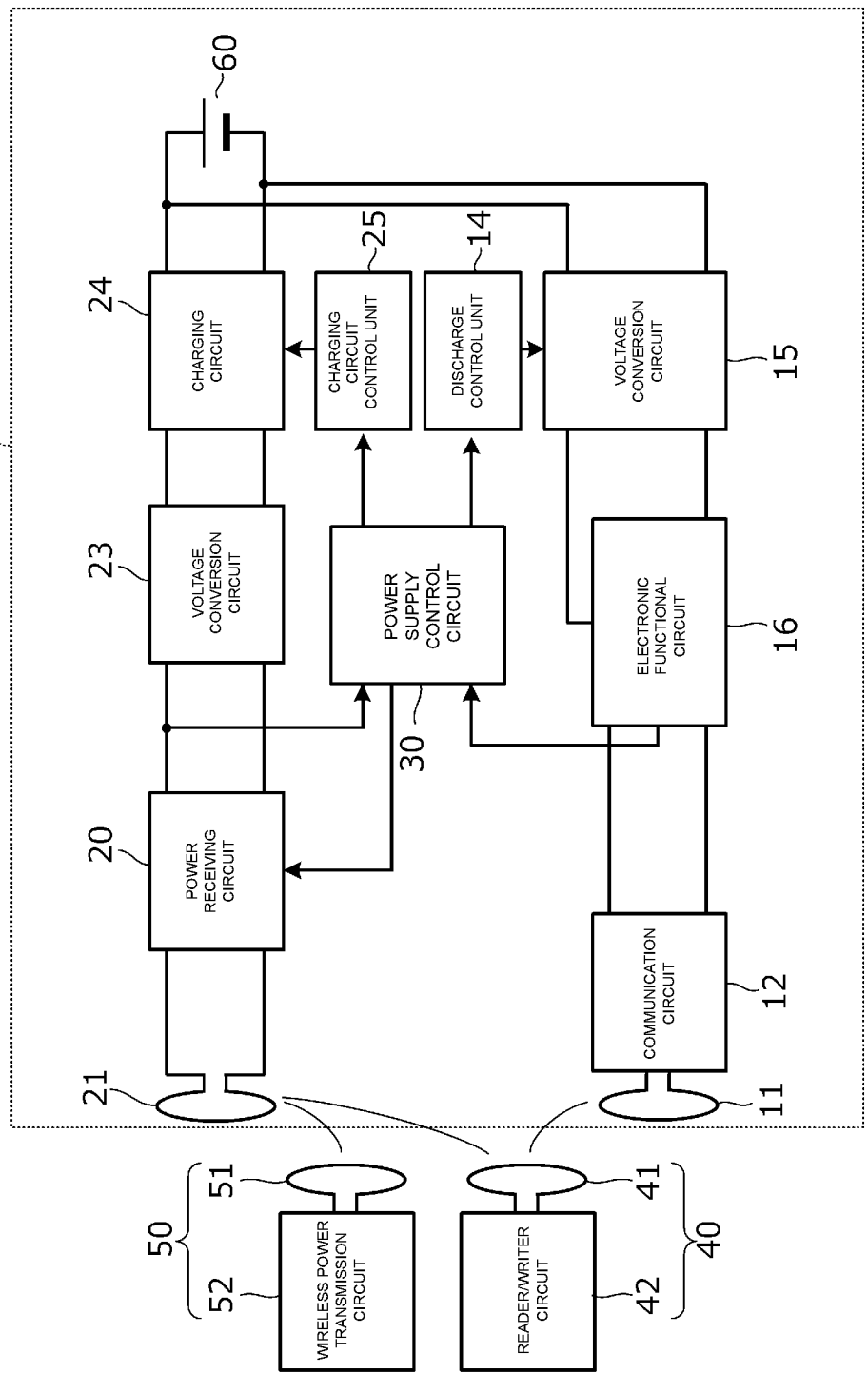
FIG. 1 is a block diagram illustrating a configuration of an IC card and an IC card system according to a first embodiment.

FIG. 1 is a block diagram illustrating a configuration of an IC card 101 and an IC card system 201 according to a first embodiment. The IC card system 201 is constituted by the IC card 101, a reader/writer 40, and a wireless power transmission device 50. The IC card 101 is an IC card that wirelessly receives power from the wireless power transmission device 50 and also communicates with the reader/writer 40 in a contactless manner. The reader/writer 40 includes a reader/writer antenna 41 and a reader/writer circuit 42. The wireless power transmission device 50 includes a wireless power transmission coil 51 and a wireless power transmission circuit 52. The wireless power transmission device 50 is, for example, a wireless power feed device using a direct current resonance technology, or a smartphone for a case where a smartphone or the like having an NFC communication function is used as a charger.

The wireless power transmission circuit 52 supplies alternating power to the wireless power transmission coil 51 in frequency bands of ISM bands (industrial scientific medical bands), such as a 2.4 GHz band, a 5.7 GHz band, and a 920 MHz band, or in frequency bands of 6.78 MHz and 13.56 MHz.

The reader/writer circuit 42 communicates with a communication circuit 12 via the reader/writer antenna 41 and a communication antenna 11, for example, at a frequency in a 13.56 MHz band.

The IC card 101 is an electronic device the size of a credit card with a thickness of 0.76 mm Examples of this IC card 101 include a smartphone the size of a card (mobile phone equipped with a mobile operating system), a transportation system IC card that displays the balance, a one-time password card, and a biometric authentication card. The IC card 101 operates actively by using an electrical energy storage device 60 as a power supply or consumes a very small amount of power of the electrical energy storage device 60 during standby. Furthermore, the IC card 101 operates passively without consuming power of the electrical energy storage device 60.

The IC card 101 includes a power receiving coil 21, a power receiving circuit 20 connected to this power receiving coil 21, the communication antenna 11, the communication circuit 12 connected to this communication antenna 11, the electrical energy storage device 60, a charging circuit 24 connected between the power receiving circuit 20 and the electrical energy storage device 60, an electronic functional circuit 16 connected to the communication circuit 12, a voltage conversion circuit 15 connected between the electrical energy storage device 60 and the electronic functional circuit 16, and a power supply control circuit 30 that controls the charging circuit 24 and the voltage conversion circuit 15.

The power receiving circuit 20 includes a power receiving resonant capacitor connected to the power receiving coil 21, and a rectifier smoothing circuit. The power receiving coil 21 and the power receiving resonant capacitor constitute a resonant circuit. A specific example of a configuration of the power receiving circuit 20 will be described later.

A voltage conversion circuit 23 converts an output voltage (received power voltage) of the power receiving circuit 20 into a voltage necessary to charge the electrical energy storage device 60.

A charging circuit control unit 25 controls operation of the charging circuit 24. A discharge control unit 14 controls operation of the voltage conversion circuit 15. The power supply control circuit 30 outputs control signals to the charging circuit control unit 25 and the discharge control unit 14 in accordance with a voltage output from the power receiving circuit 20 and a communication detection signal output from the electronic functional circuit 16. Furthermore, when an output voltage of the power receiving circuit 20 is not less than a predetermined value, that is, when an overvoltage state is reached, the power supply control circuit 30 controls a switch element of the rectifier smoothing circuit within the power receiving circuit 20 to thereby stop a rectification operation and thus interrupts reception of power.

General operations performed by the IC card 101 are as follows.

[Case where IC Card 101 is Placed on Wireless Power Transmission Device 50]

The power receiving coil 21 is electromagnetically coupled to the wireless power transmission coil 51, and the power receiving circuit 20 receives power wirelessly. Thus, the voltage conversion circuit 23 converts an output voltage of the power receiving circuit 20 into a voltage necessary to charge the electrical energy storage device 60.

When the power supply control circuit 30 detects that a power reception detection signal, which is an output voltage signal of the power receiving circuit 20, has exceeded the predetermined value, the power supply control circuit 30 activates the charging circuit 24 via the charging circuit control unit 25. Thus, the charging circuit 24 charges the electrical energy storage device 60 with an output voltage of the voltage conversion circuit 23.

[Case where IC Card 101 is Moved Closer to Reader/Writer 40]

The communication antenna 11 is electromagnetically coupled to the reader/writer antenna 41, and the communication circuit 12 communicates with the reader/writer circuit 42.

The electronic functional circuit 16 detects operation of the communication circuit 12 and outputs a communication detection signal to the power supply control circuit 30.

The power supply control circuit 30 activates the voltage conversion circuit 15 via the discharge control unit 14. Thus, the voltage conversion circuit 15 converts a voltage of the electrical energy storage device 60 into a power supply voltage necessary for the electronic functional circuit 16 to output the power supply voltage to the electronic functional circuit 16.

The electronic functional circuit 16 operates by using power received by the communication circuit 12 and output power of the voltage conversion circuit 15.

The power receiving coil 21 is electromagnetically coupled to the reader/writer antenna 41, and the power receiving circuit 20 receives power wirelessly. Thus, the voltage conversion circuit 23 converts an output voltage of the power receiving circuit 20 into a voltage necessary to charge the electrical energy storage device 60.

Figure 2:
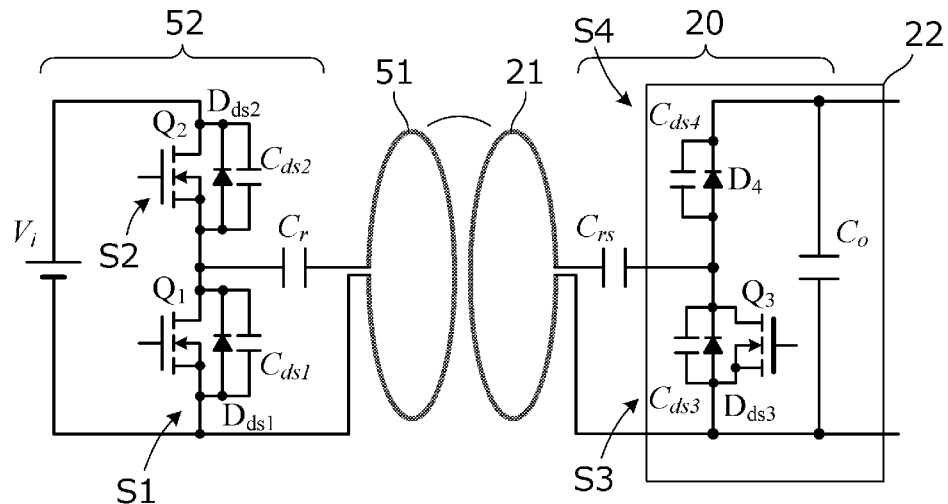
FIG. 2 illustrates a first example of a circuit configuration of a portion involved in a wireless power feed system.

FIG. 2 illustrates a first example of a circuit configuration of a portion involved in a wireless power feed system. In this example, a power transmission side is a circuit in which a class-D inverter operation is performed, and a power reception side is a circuit in which series resonance is performed and a voltage doubling rectification operation is performed.

The wireless power transmission circuit 52 includes a first switch circuit S1 constituted by a parallel connection circuit equivalently including a switching element Q1, a diode Dds1, and a capacitor Cds1, a second switch circuit S2 constituted by a parallel connection circuit equivalently including a switching element Q2, a diode Dds2, and a capacitor Cds2, a switching control circuit, which is not illustrated, that controls the switching elements Q1 and Q2, a resonant capacitor Cr, and a direct-current power supply Vi. The wireless power transmission coil 51 and the resonant capacitor Cr constitute a power transmission resonant circuit.

The switching elements Q1 and Q2 are switched on and off in accordance with a signal from the switching control circuit, which is not illustrated. The switching element Q1 of the first switch circuit S1 and the switching element Q2 of the second switch circuit S2 are alternately turned on and off.

The switching elements Q1 and Q2 are switching elements, such as MOSFETs, having parasitic output capacitance and/or a parasitic diode and constitute the respective switch circuits S1 and S2.

When the switching control circuit for the wireless power transmission circuit 52 switches the switching element Q1 and the switching element Q2 on and off at a predetermined operating frequency, a direct-current voltage is intermittently supplied to the power transmission resonant circuit to cause the wireless power transmission coil 51 to generate a resonant current. This causes a sinusoidal current to pass through the wireless power transmission coil 51. Specifically, a switching operation is performed at 13.56 MHz used in NFC communication.

The power receiving circuit 20 includes a power receiving resonant circuit constituted by the power receiving coil 21 and a resonant capacitor Crs, and a rectifier smoothing circuit 22. The rectifier smoothing circuit 22 includes a third switch circuit S3 constituted by a parallel connection circuit equivalently including a switching element Q3, a diode Dds3, and a capacitor Cds3, and a fourth switch circuit S4 constituted by a parallel connection circuit equivalently including a diode D4 and a capacitor Cds4.

The third switch circuit S3 and the fourth switch circuit S4 rectify a voltage generated in the power receiving resonant circuit constituted by the power receiving coil 21 and the resonant capacitor Crs, and a capacitor Co smooths the voltage. In this example, the power receiving coil 21 and the resonant capacitor Crs constitute a series resonant circuit.

Figure 3:
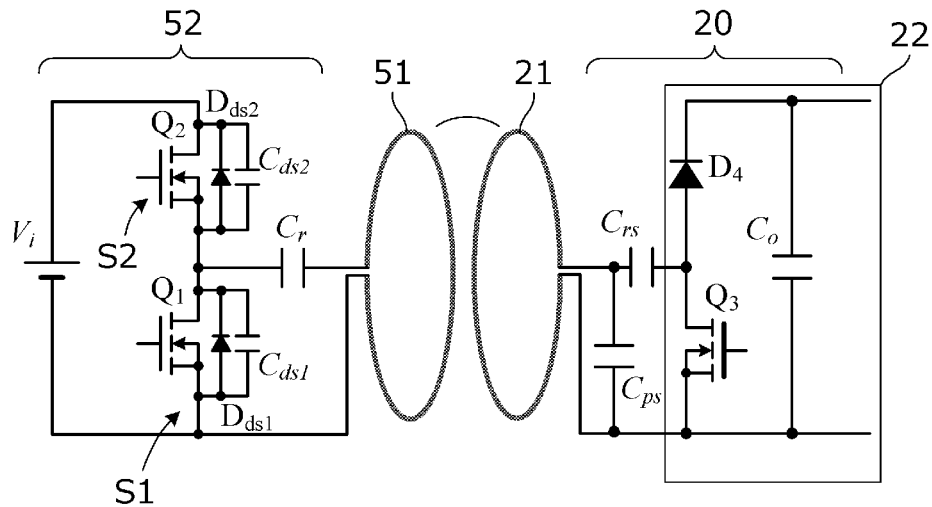
FIG. 3 illustrates a second example of the circuit configuration of the portion involved in the wireless power feed system.

FIG. 3 illustrates a second example of the circuit configuration of the portion involved in the wireless power feed system. In this example, the power transmission side is a circuit in which a class-D inverter operation is performed, and the power reception side is a circuit in which parallel series resonance is achieved and a voltage doubling rectification operation is performed. A configuration of the power transmission side is the same as the example illustrated in FIG. 2. In the power reception side, resonant capacitors Crs and Cps connected to the power receiving coil 21 are included. The power receiving coil 21 and the resonant capacitor Crs constitute a series resonant circuit, and the power receiving coil 21 and the resonant capacitor Cps constitute a parallel resonant circuit. A configuration of the rectifier smoothing circuit 22 is the same as the example illustrated in FIG. 2.

Figure 4:
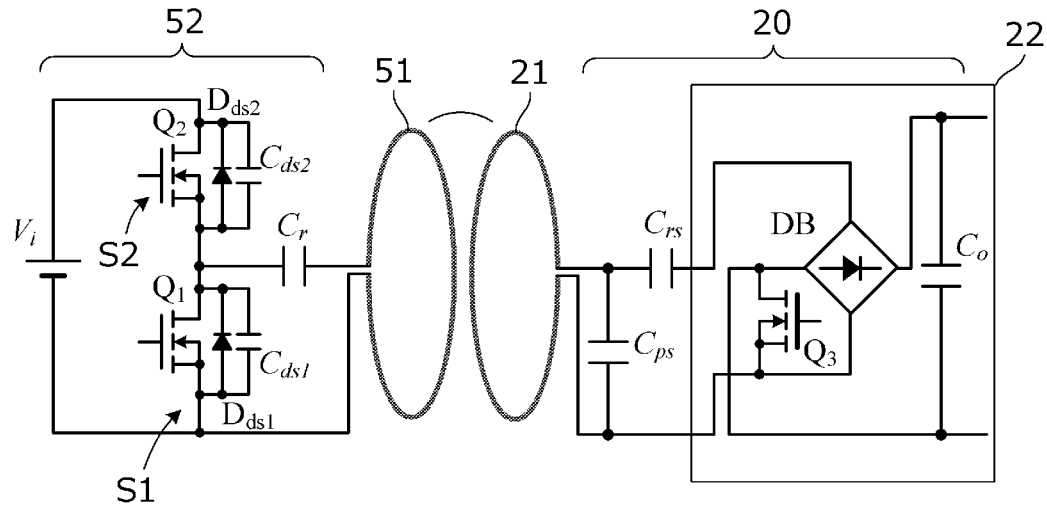
FIG. 4 illustrates a third example of the circuit configuration of the portion involved in the wireless power feed system.

FIG. 4 illustrates a third example of the circuit configuration of the portion involved in the wireless power feed system. In this example, the power transmission side is a circuit in which a class-D inverter operation is performed, and the power reception side is a circuit in which parallel series resonance is achieved and a full-wave rectification operation is performed. A configuration of the power transmission side is the same as the example illustrated in FIG. 2. In the power reception side, the resonant capacitors Crs and Cps connected to the power receiving coil 21 are included. The power receiving coil 21 and the resonant capacitor Crs constitute a series resonant circuit, and the power receiving coil 21 and the resonant capacitor Cps constitute a parallel resonant circuit. The rectifier smoothing circuit 22 is constituted by a diode bridge DB, the switching element Q3, and the capacitor Co. The diode bridge DB performs full-wave rectification of resonant voltages generated in the power receiving resonant circuits constituted by the power receiving coil 21 and the resonant capacitors Crs and Cps. When the switching element Q3 is in an on state, the switching element Q3 stops the full-wave rectification operation performed by the diode bridge DB and thus stops reception of power.

Figure 5:
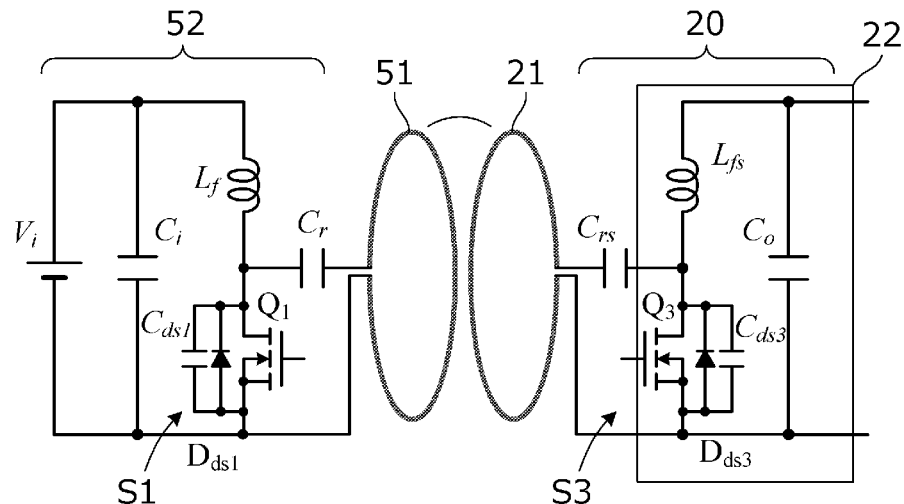
FIG. 5 illustrates a fourth example of the circuit configuration of the portion involved in the wireless power feed system.

FIG. 5 illustrates a fourth example of the circuit configuration of the portion involved in the wireless power feed system. In this example, the power transmission side is a circuit in which a class-E inverter operation is performed, and the power reception side is a circuit in which series resonance is achieved and a class-E rectification operation is performed.

The wireless power transmission circuit 52 includes the first switch circuit S1 constituted by the parallel connection circuit equivalently including the switching element Q1, the diode Dds1, and the capacitor Cds1, an inductor Lf, and the resonant capacitor Cr. The wireless power transmission coil 51 and the resonant capacitor Cr constitute a power transmission resonant circuit.

The switching element Q1 is switched on and off in accordance with a signal from the switching control circuit, which is not illustrated.

The switching element Q1 is a switching element, such as a MOSFET, having parasitic output capacitance and/or a parasitic diode and constitutes the first switch circuit S1.

When the switching control circuit for the wireless power transmission circuit 52 switches the switching element Q1 on and off at a predetermined operating frequency, a direct-current voltage is intermittently supplied to a resonant circuit constituted by the inductor Lf, the resonant capacitor Cr, and the wireless power transmission coil 51 to cause the wireless power transmission coil 51 to generate a resonant current. This causes a sinusoidal current to pass through the power transmission coil 51.

The power receiving circuit 20 includes the power receiving resonant circuit constituted by the power receiving coil 21 and the resonant capacitor Crs, and the rectifier smoothing circuit 22. The rectifier smoothing circuit 22 includes the third switch circuit S3 constituted by the parallel connection circuit equivalently including the switching element Q3, the diode Dds3, and the capacitor Cds3, an inductor Lfs, and the capacitor Co.

The third switch circuit S3 rectifies a voltage generated in a power receiving resonant circuit constituted by the power receiving coil 21, the resonant capacitor Crs, and the inductor Lfs, and the capacitor Co smooths the voltage.

Figure 6:
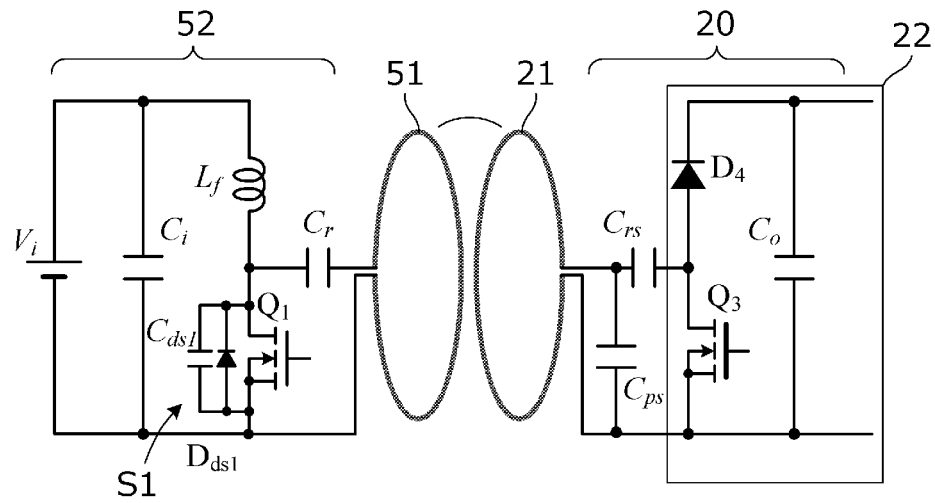
FIG. 6 illustrates a fifth example of the circuit configuration of the portion involved in the wireless power feed system.

FIG. 6 illustrates a fifth example of the circuit configuration of the portion involved in the wireless power feed system. In this example, the power transmission side is a circuit in which a class-E inverter operation is performed, and the power reception side is a circuit in which parallel series resonance is achieved and a voltage doubling rectification operation is performed.

A configuration of the wireless power transmission circuit 52 is similar to the example illustrated in FIG. 5. A configuration of the power receiving circuit 20 is similar to the example illustrated in FIG. 3.

Figure 7:
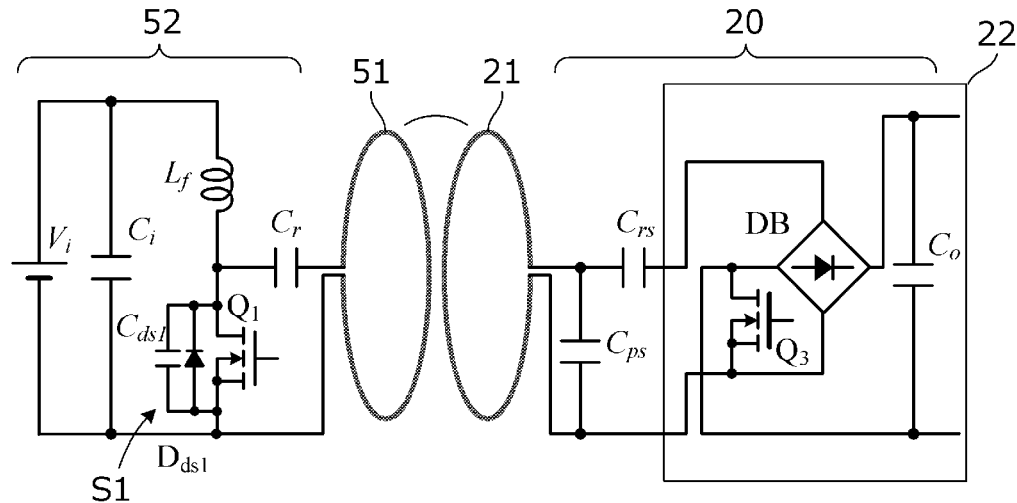
FIG. 7 illustrates a sixth example of the circuit configuration of the portion involved in the wireless power feed system.

FIG. 7 illustrates a sixth example of the circuit configuration of the portion involved in the wireless power feed system. In this example, the power transmission side is a circuit in which a class-E inverter operation is performed, and the power reception side is a circuit in which parallel series resonance is achieved and a full-wave rectification operation is performed.

A configuration of the wireless power transmission circuit 52 is similar to the example illustrated in FIG. 5. A configuration of the power receiving circuit 20 is similar to the example illustrated in FIG. 4.

As in the above-described examples, as a configuration of a circuit involved in the wireless power feed system, various types of configurations can be employed.

Figure 8:
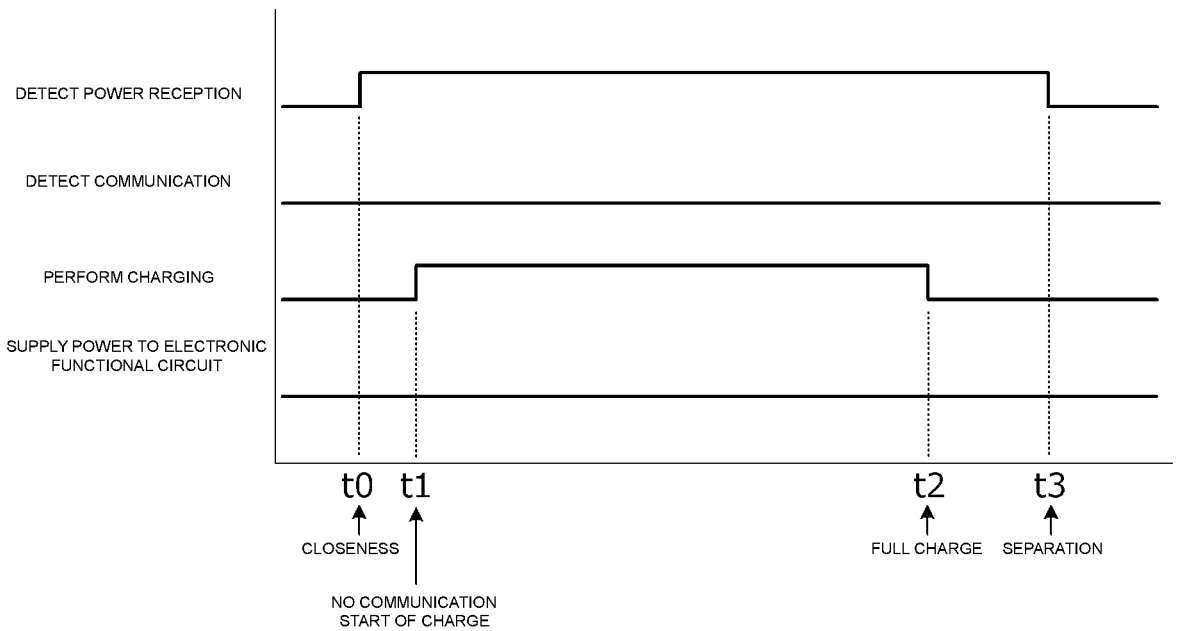
FIG. 8 is a time chart illustrating operations performed by the IC card after the IC card is placed on a wireless power transmission device.

FIG. 8 is a time chart illustrating operations performed by the IC card 101 after the IC card 101 is placed on the wireless power transmission device 50. When the IC card 101 is placed on the wireless power transmission device 50, when the power supply control circuit 30 detects that a received power voltage has exceeded a predetermined value at a timing t0, the power supply control circuit 30 detects the presence or absence of a communication detection signal at that point in time. Since this example is an example in which the IC card 101 is placed on the wireless power transmission device 50, there is no communication detection signal. When there is no communication detection signal, the voltage conversion circuit 15 is not activated, and no power is supplied to the electronic functional circuit 16. On the other hand, the charging circuit 24 is activated immediately at a timing t1, and the electrical energy storage device 60 starts to be charged.

Subsequently, when a fully charged state is reached at a timing t2 before the IC card 101 is separated from the wireless power transmission device 50 at a timing t3, charging is stopped. Such detection of full charge and stopping of charging are controlled by the charging circuit 24.

Thus, when there is no communication, the electrical energy storage device 60 starts to be charged immediately without power being supplied to the electronic functional circuit 16, and the electrical energy storage device 60 is therefore efficiently charged.

Figure 9:
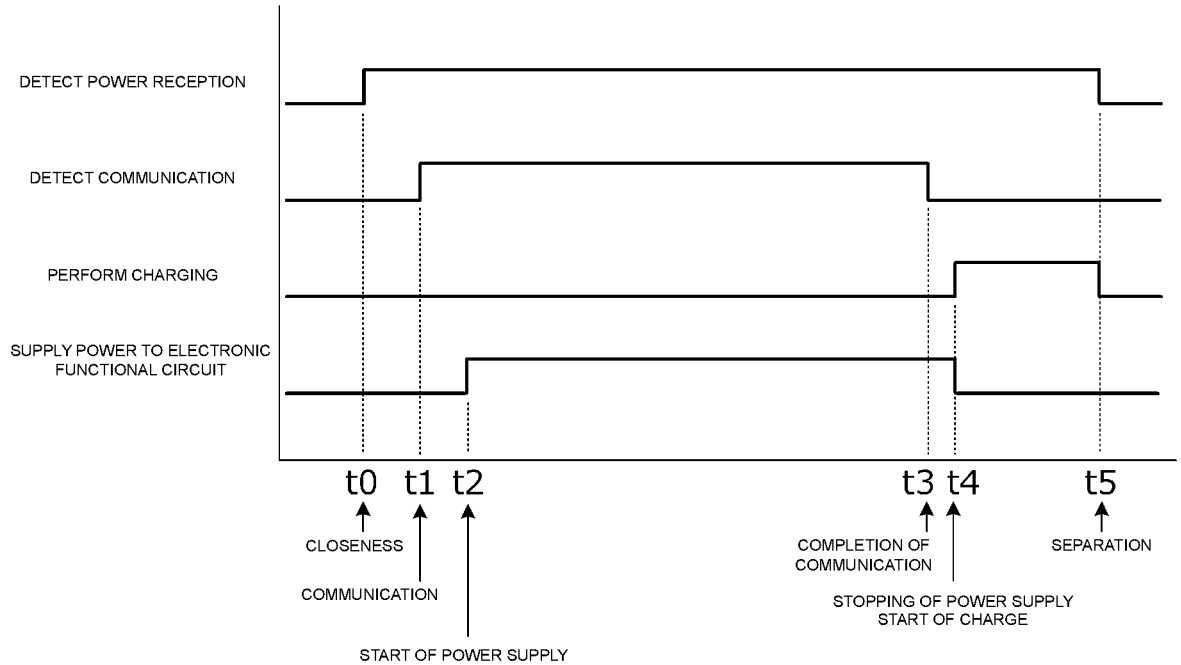
FIG. 9 is a time chart illustrating operations performed by the IC card after the IC card is moved closer to a reader/writer.

FIG. 9 is a time chart illustrating operations performed by the IC card 101 after the IC card 101 is moved closer to the reader/writer 40. When the IC card 101 is moved closer to the reader/writer 40, when the power supply control circuit 30 detects that a received power voltage has exceeded a predetermined value at a timing t0, the power supply control circuit 30 detects the presence or absence of a communication detection signal at that point in time. Since this example is an example in which the IC card 101 is held over the reader/writer 40, communication is detected at a timing t1 after reception of power is started. When the communication is started, the power supply control circuit 30 activates the voltage conversion circuit 15 without activating the charging circuit 24, that is, without starting to charge the electrical energy storage device 60, and starts to supply power to the electronic functional circuit 16 at a timing t2. Thus, the electronic functional circuit 16 subsequently operates with power supplied from the voltage conversion circuit 15.

In the example illustrated in FIG. 9, when completion of the communication is detected at a timing t3, power supply to the electronic functional circuit 16 is stopped at a subsequent timing t4, and simultaneously the electrical energy storage device 60 starts to be charged. Subsequently, when the IC card 101 is separated from the reader/writer 40 at a timing t5, charging is physically stopped.

Thus, when communication is detected, power starts to be supplied to the electronic functional circuit 16 immediately without the charging circuit 24 being activated, and communication is therefore performed quickly. Furthermore, in this example, after the communication is completed, the electrical energy storage device 60 can be charged even in a short time.

Second Embodiment

In a second embodiment, an IC card will be described in which details of control performed by the power supply control circuit 30 differ from the examples described in the first embodiment. A circuit configuration itself of the IC card is set forth in FIG. 1.

Figure 10A:
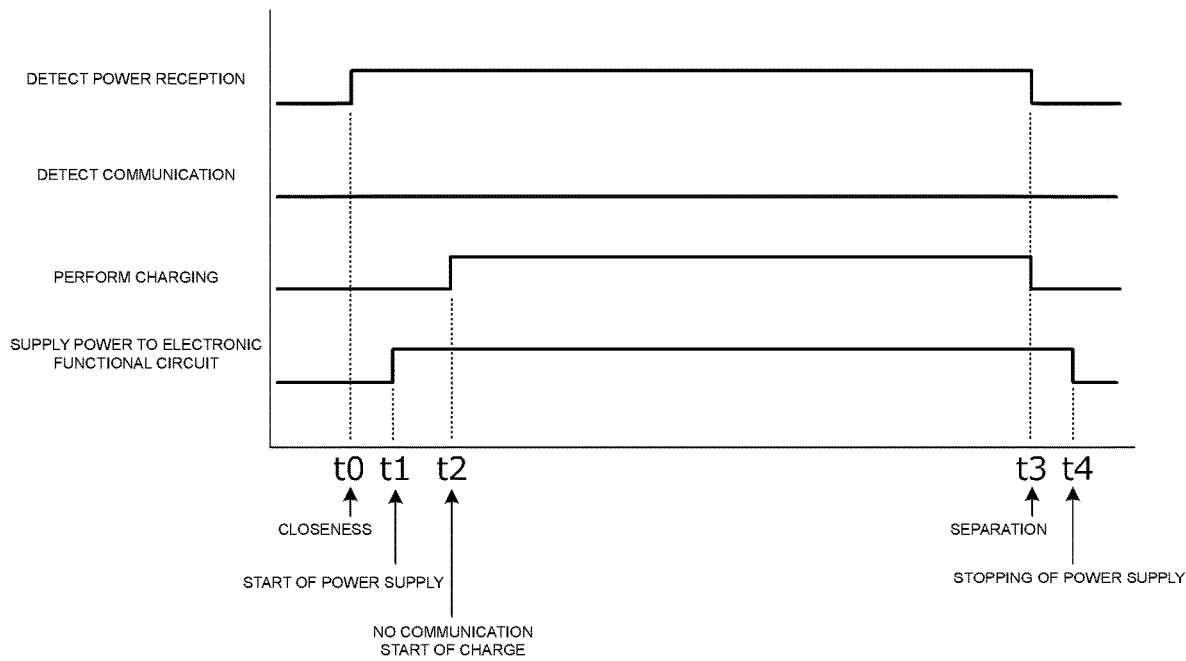
FIGS. 10A and 10B are time charts illustrating operations performed by the IC card according to a second embodiment after the IC card is moved closer to the reader/writer.

FIG. 10A is a time chart illustrating operations performed by the IC card 101 after the IC card 101 is moved closer to the reader/writer 40. When power is received by moving the IC card 101 closer to the reader/writer 40, the power supply control circuit 30 activates the voltage conversion circuit 15. Thus, power starts to be supplied from the voltage conversion circuit 15 to the electronic functional circuit 16. In an example illustrated in FIG. 10A, power is supplied to the electronic functional circuit 16 at a timing t1. Subsequently, the presence or absence of a communication detection signal is detected at a timing t2. When there is no communication, the power supply control circuit 30 starts to charge the electrical energy storage device 60. Subsequently, when the IC card 101 is separated from the reader/writer 40 at a timing t3, charging of the electrical energy storage device 60 is physically stopped. Furthermore, power supply from the voltage conversion circuit 15 to the electronic functional circuit 16 is stopped.

Figure 10B:
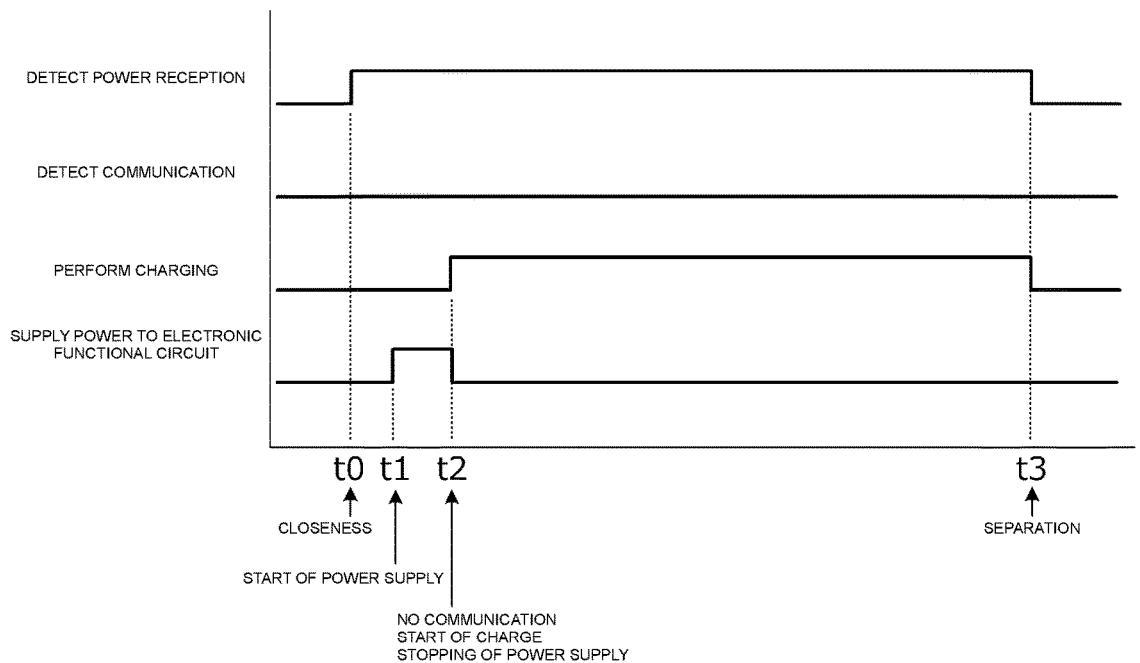

As in the example illustrated in FIG. 10A, FIG. 10B is a time chart illustrating operations performed by the IC card 101 after the IC card 101 is moved closer to the reader/writer 40. When power is received by moving the IC card 101 closer to the reader/writer 40, power is supplied from the voltage conversion circuit 15 to the electronic functional circuit 16. In an example illustrated in FIG. 10B, power is supplied to the electronic functional circuit 16 at a timing t1. Subsequently, the presence or absence of a communication detection signal is detected at a timing t2. When there is no communication, the power supply control circuit 30 stops the voltage conversion circuit 15 to stop power supply to the electronic functional circuit 16. Furthermore, the charging circuit 24 is activated to start to charge the electrical energy storage device 60. Subsequently, when the IC card 101 is separated from the reader/writer 40 at a timing t3, charging of the electrical energy storage device 60 is physically stopped.

Thus, when there is no communication, the electrical energy storage device 60 starts to be charged immediately without power being supplied to the electronic functional circuit 16, and the electrical energy storage device 60 is therefore efficiently charged. In particular, as illustrated in FIG. 10B, power supply to the electronic functional circuit 16 is stopped immediately when the absence of communication is detected, thereby enabling an increase in charging efficiency of the electrical energy storage device 60.

As in the examples illustrated in FIGS. 10A and 10B, FIG. 11 is a time chart illustrating operations performed by the IC card 101 after the IC card 101 is moved closer to the reader/writer 40. When power is received by moving the IC card 101 closer to the reader/writer 40, power is supplied from the voltage conversion circuit 15 to the electronic functional circuit 16. In an example illustrated in FIG. 11, power is supplied to the electronic functional circuit 16 at a timing t1. Subsequently, the presence or absence of a communication detection signal is detected at a timing t2. When there is communication, the power supply control circuit 30 causes the charging circuit 24 to remain stopped so that the electrical energy storage device 60 is not charged. Subsequently, when completion of the communication is detected at a timing t3, power supply to the electronic functional circuit 16 is stopped at a subsequent timing t4, and simultaneously the electrical energy storage device 60 starts to be charged. Subsequently, when the IC card 101 is separated from the reader/writer 40 at a timing t5, charging is physically stopped.

Thus, when power reception is detected, power is supplied to the electronic functional circuit 16 immediately, and communication is therefore performed quickly. Furthermore, when the electrical energy storage device 60 starts to be charged immediately after the communication is completed, the electrical energy storage device 60 can be charged even in a short time.

Finally, the present disclosure is not to be limited to the above-described embodiments. Modifications and changes may be made as appropriate by those skilled in the art. The scope of the present disclosure is defined not by the above-described embodiments but by the claims. Furthermore, the scope of the present disclosure includes modifications and changes made to the embodiments within a scope equivalent to the claims.

What is claimed is:

1. An IC card configured to communicate with a reader/writer, which is induction-type read/write communication equipment, in a contactless manner, the IC card comprising:
    a power receiving coil;
    a power receiving circuit connected to the power receiving coil;
    a communication antenna; a communication circuit connected to the communication antenna;
    an electrical energy storage device;
    a charging circuit connected between the power receiving circuit and the electrical energy storage device;
    an electronic functional circuit connected to the communication circuit;
    a voltage conversion circuit connected between the electrical energy storage device and the electronic functional circuit; and
    a power supply control circuit configured to control the charging circuit and the voltage conversion circuit,
    wherein the power supply control circuit is configured to
        detect or power reception in accordance with an output voltage of the power receiving circuit,
        detect or predetermined communication by using the electronic functional circuit,
        when there is not the predetermined communication immediately after power reception is detected, start to charge the electrical energy storage device by using the charging circuit, and,
        when there is the predetermined communication immediately after power reception is detected, supply power from the voltage conversion circuit to the electronic functional circuit without starting to charge the electrical energy storage device by using the charging circuit.

2. The IC card according to claim 1, wherein
    when there is the predetermined communication, the power supply control circuit is configured to start to charge the electrical energy storage device by using the charging circuit after operation of the electronic functional circuit is completed.

3. The IC card according to claim 1, wherein
    the charging circuit includes a unit configured to detect whether or not a voltage of the electrical energy storage device has reached a voltage equivalent to full charge, and
    when the charging circuit detects the full charge, the power supply control circuit is configured to stop charging the electrical energy storage device by using the charging circuit.

4. The IC card according to claim 1, wherein
when the output voltage of the power receiving circuit is not less than a predetermined value, the power supply control circuit is configured to interrupt reception of power.

5. The IC card according to claim 1, wherein
the electronic functional circuit is a fingerprint authentication circuit.

6. The IC card according to claim 1, wherein
the power receiving circuit includes a power receiving resonant capacitor, and the power receiving resonant capacitor and the power receiving coil are configured as a power receiving resonant mechanism.

7. An IC card system comprising:
the IC card according to claim 1; and
a wireless power transmission device configured to wirelessly transmit power to the IC card,
wherein the wireless power transmission device includes a power transmission coil configured to electromagnetically couple to the power receiving coil.

8. The IC card system according to claim 7, wherein
the power transmission coil of the wireless power transmission device and the power receiving coil of the IC card are coupled to each other via an electromagnetic field in a frequency band of an ISM band.

9. The IC card system according to claim 7, wherein
the power transmission coil of the wireless power transmission device and the power receiving coil of the IC card are coupled to each other via an electromagnetic field in a 13.56 MHz band.

10. The IC card according to claim 2, wherein
the charging circuit includes a unit configured to detect whether or not a voltage of the electrical energy storage device has reached a voltage equivalent to full charge, and
when the charging circuit detects the full charge, the power supply control circuit is configured to stop charging the electrical energy storage device by using the charging circuit.

11. The IC card according to claim 2, wherein
when the output voltage of the power receiving circuit is not less than a predetermined value, the power supply control circuit is configured to interrupt reception of power.

12. An IC card configured to communicate with a reader/writer, which is induction-type read/write communication equipment, in a contactless manner, the IC card comprising:
a power receiving coil; a power receiving circuit connected to the power receiving coil;
a communication antenna; a communication circuit connected to the communication antenna;
an electrical energy storage device; a charging circuit connected between the power receiving circuit and the electrical energy storage device;
an electronic functional circuit connected to the communication circuit; a voltage conversion circuit connected between the electrical energy storage device and the electronic functional circuit; and
a power supply control circuit configured to control the charging circuit and the voltage conversion circuit,
wherein the power supply control circuit is configured to
detect or power reception in accordance with an output voltage of the power receiving circuit,
detect or predetermined communication by using the electronic functional circuit,
supply power from the voltage conversion circuit to the electronic functional circuit in accordance with power reception,
when there is the predetermined communication, continue supplying power from the voltage conversion circuit to the electronic functional circuit, and,
when there is not the predetermined communication, continue or stop supplying power from the voltage conversion circuit to the electronic functional circuit and start to charge the electrical energy storage device by using the charging circuit.

13. The IC card according to claim 12, wherein
when there is the predetermined communication, the power supply control circuit is configured to start to charge the electrical energy storage device by using the charging circuit after operation of the electronic functional circuit is completed.

14. The IC card according to claim 12, wherein
the charging circuit includes a unit configured to detect whether or not a voltage of the electrical energy storage device has reached a voltage equivalent to full charge, and
when the charging circuit detects the full charge, the power supply control circuit is configured to stop charging the electrical energy storage device by using the charging circuit.

15. The IC card according to claim 12, wherein
when the output voltage of the power receiving circuit is not less than a predetermined value, the power supply control circuit is configured to interrupt reception of power.

16. The IC card according to claim 12, wherein
the electronic functional circuit is a fingerprint authentication circuit.

17. The IC card according to claim 12, wherein
the power receiving circuit includes a power receiving resonant capacitor, and the power receiving resonant capacitor and the power receiving coil are configured as a power receiving resonant mechanism.

18. An IC card system comprising:
the IC card according to claim 12; and
a wireless power transmission device configured to wirelessly transmit power to the IC card,
wherein the wireless power transmission device includes a power transmission coil configured to electromagnetically couple to the power receiving coil.

19. The IC card system according to claim 18, wherein
the power transmission coil of the wireless power transmission device and the power receiving coil of the IC card are coupled to each other via an electromagnetic field in a frequency band of an ISM band.

20. The IC card system according to claim 18, wherein
the power transmission coil of the wireless power transmission device and the power receiving coil of the IC card are coupled to each other via an electromagnetic field in a 13.56 MHz band.

* * * * *